UNITED STATES PATENT OFFICE.

ROBERT WAHL, OF CHICAGO, ILLINOIS.

MANUFACTURE OF BURTON SALTS.

1,156,448. Specification of Letters Patent. Patented Oct. 12, 1915.

No Drawing. Application filed June 13, 1914, Serial No. 844,893. Renewed April 12, 1915. Serial No. 20,943.

*To all whom it may concern:*

Be it known that I, ROBERT WAHL, a citizen of the United States, residing at Chicago, in the county of Cook and State of Illinois, have invented a new and useful Improvement in the Manufacture of Burton Salts, of which the following is a specification.

My invention relates to an improvement in the manufacture of Burton salts, which are used extensively in England for "burtonizing" or correcting brewing waters used in mashing the malt or other materials to produce the same quality of finished product of ale or beer as that obtained by the use of natural water used for brewing and supplied from the wells in Burton-on-Trent. The "Burton" well water is characterized by its content of mineral substances, of which calcium sulfate is the principal ingredient, then sodium chlorid and small quantities of magnesium sulfate. Small quantities of calcium and magnesium carbonates also occur in this natural water, but serve no useful purpose in its use as brewing water.

Burton salts is a staple article of commerce in England for mixture with the brewing water more usually in the manufacture of pale ales. These salts consist of a mixture of calcium sulfate, magnesium sulfate and sodium chlorid, in various proportions according to individual requirement. In this country Burton salts are also employed to advantage, particularly in brewing ales and pale beers, when the brewing water contains too little of the desirable mineral substances mentioned; and the salts are prepared by mixing precipitated dry calcium sulfate with sodium chlorid and magnesium sulfate.

The primary objects of my invention are to greatly simplify the manufacture of Burton salts and to augment the solubility of the product.

To practise my improved process, I mix, in equal or approximately equal proportions, commercial calcium chlorid ($CaCl_2 6H_2O$) with commercial sodium sulfate, or Glauber salts ($Na_2SO_4 10H_2O$) in a molten condition. The Glauber salts melts at a temperature of about 95° F. The calcium chlorid is preferably added in dry condition and may be finely pulverized or in a coarse state. It readily reacts with the sodium sulfate in the liquid form to which it is reduced by melting, and the magnesium chlorid contained in the commercial calcium chlorid reacts readily with the sodium sulfate, forming precipitated calcium sulfate and precipitated magnesium sulfate and sodium chlorid, resulting as a whole in a preparation suitable for most of the brewing waters employed in this country that are deficient in the aforesaid desirable mineral ingredients. By mixing together the pulverized calcium chlorid and molten sodium sulfate, the following chemical reaction takes place:

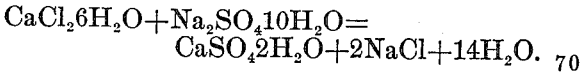
$$CaCl_2 6H_2O + Na_2SO_4 10H_2O = CaSO_4 2H_2O + 2NaCl + 14H_2O.$$

The product may be put up in packages, and is available for use, immediately after being thus prepared. Its physical condition is that of a semi-solid or paste, from which a small quantity of liquor, holding in solution some of the mineral ingredients particularly sodium chlorid, separates and may, if desired, be drained off to obtain the product in a more solid condition; or it may be pressed out, as by using a hydraulic or other suitable press, since the liquor readily separates from the precipitated solid calcium sulfate.

The moist condition in which my improved process enables the product to be furnished to the user, enhances its solubility and the uniformity of its action in all cases.

What I claim as new and desire to secure by Letters Patent is:—

1. The process of manufacturing salts for burtonizing brewing waters and containing as principal ingredients precipitated calcium sulfate and sodium chlorid, which consists in mixing calcium chlorid with Glauber salts in a molten condition.

2. The process of manufacturing salts for burtonizing brewing waters and containing as principal ingredients precipitated calcium sulfate and sodium chlorid, which consists in heating and thereby melting Glauber salts, mixing calcium chlorid with the liquefied Glauber salts, and separating the resultant liquor out of the product.

3. As a new article of manufacture, salts for burtonizing brewing waters, consisting of a paste-like product containing calcium sulfate in a wholly and readily soluble condition, sodium chlorid and magnesium sulfate.

ROBERT WAHL.

In presence of—
 JOHN V. NALIKOWSKY,
 WALTER GRIEFENOW.